VARIABLE COUPLING MICROSTRIP PARALLEL-LINE DIRECTIONAL COUPLER

Filed March 24, 1969

INVENTORS.
HERBERT WARREN COOPER
ROBERT Q. MACLEAY
BY Ernest P. Klipfel
ATTORNEY United States Patent Office 3,560,886

Patented Feb. 2, 1971

3,560,886

VARIABLE COUPLING MICROSTRIP PARALLEL-LINE DIRECTIONAL COUPLER

Herbert Warren Cooper, Hyattsville, and Robert Q. Macleay, Severna Park, Md., assignors to Westinghouse Electric Corporation, Pittsburgh, Pa., a corporation of Pennsylvania Filed Mar. 24, 1969, Ser. No. 809,669

Int. Cl. H01l *3/00;* H01p *5/14*

U.S. Cl. 333—10 7 Claims

ABSTRACT OF THE DISCLOSURE

Described is a novel variable coupling, directional coupler employing microstrip transmission lines on a semiconductive substrate. Variable coupling is achieved by the provision of a distributed P-N junction in the coupling region of the semiconductive substrate of a microstrip quarter-wavelength parallel-line directional coupler. By proper variation of a bias potential across the P-N junction, the depletion-layer capacitance of the junction can be altered. This variation in capitance with variation in bias alters the total coupling capacitance between the parallel microstrip transmission lines and, hence, alters the electromagnetic energy coupled.

CROSS-REFERENCES TO RELATED APPLICATIONS

Application Ser. No. 809,670, filed Mar. 24, 1969 and assigned to the assignee of the present application.

BACKGROUND OF THE INVENTION

With the availability of microwave transistors and other semiconductor devices usable at microwave frequencies, the microstrip transmission line has found wide application because of its compatability with the fabrication and installation of passive components and active devices on the same substrate with the transmission line. Essentially, a microstrip transmission line consists of a strip of conductive material, corresponding to the center conductor of a coaxial transmission line, deposited on one side of a dielectric or semiconductive substrate by photoresist techniques. The opposite side of the substrate is covered with a layer of conductive material comprising a ground plane and corresponding to the outer cylindrical conductor of a coaxial transmission line. With this configuration, and assuming that a source of wave energy is applied across the strip and ground plane on opposite sides of the substrate, an electric field is established between the two.

In the past, parallel-line couplers utilizing microstrip circuitry have been devised; however they are limited in the degree of electromagnetic energy coupling obtainable. Such prior art couplers require that any improvement in the degree of coupling between the branch lines be obtained by decreasing the perpendicular distance between the two microstrips, or require dielectric overlays to increase the coupling. Spacings on the order of about 0.0001 inch are required for a 3 db coupling coefficient. As will be appreciated, this is very difficult to accomplish repeatedly with present photoresist techniques.

SUMMARY OF THE INVENTION

As an overall object, the present invention seeks to provide a microstrip parallel-line coupler capable of achieving a high degree of coupling between branch lines without resorting to the extremely close spacing between branch lines required of prior art devices. While spacings as small as 0.0001 inch were required in the past to achieve a high degree of coupling, this spacing can be increased to 0.001 inch with the present invention without sacrificing coupling efficiency. As will be understood, this greatly reduces the tolerance requirements of the photoresist techniques utilized to produce the coupler.

Another object of the invention is to provide a microstrip parallel-line coupler wherein the coupling coefficient between branch lines can be varied, within limits, without changing the geometry of the microstrip branch lines.

In accordance with the invention, microstrip transmission lines are deposited, by photoresist etching techniques, in parallel side-by-side relationship on a semiconductor substrate. The microstrip transmission lines extend parallel to each other through a distance equal to a quarter-wavelength of the wave energy to be coupled. Beneath the parallel microstrips, in the coupling regoin between the two, is formed a P-N junction. By applying a bias across the P-N junction and by varying that bias (forward up to the contact potential and reverse to breakdown), the depletion-layer capacitance of the junction can be varied as well as the total coupling capacitance between the parallel microstrip transmission lines.

The above and other objects and features of the invention will become apparent from the following detailed description taken in connection with the accompanying drawings which form a part of this specification, and in which.

Figure 1:
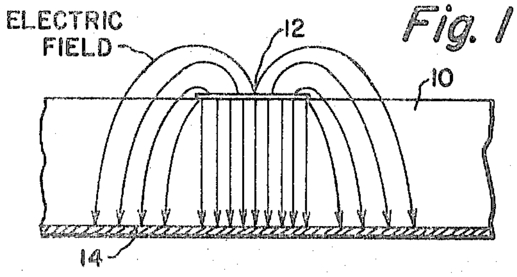
FIG. 1 is a cross-sectional view of a typical microstrip transmission line showing the electric field existing between the microstrip transmission line on one side of a wafer of dielectric or semiconductive material and a ground plane on the other side of the wafer.

With reference now to the drawings, and particularly to FIG. 1, the cross section of a typical microstrip transmission line is shown. It comprises a wafer 10 of dielectric or semiconductive material having a thin strip 12 of conducting material, such as silver, deposited on its upper surface by photoresist etching techniques. The entire bottom of the wafer 10 is covered with a layer of metal 14, such as aluminum, comprising a ground plane. If it is assumed, for example, that the center conductor of a coaxial wave transmission line is connected to the strip 12 and that the outer cylindrical conductor is connected to the ground plane 14, the electric field shown will be established between the strip 12 and the ground plane 14, this electric field corresponding to that existing between the center conductor and outer cylindrical shell of a coaxial transmission line. The magnetic fields, of course, will be at right angles to the electric field shown in FIG. 1.

Figure 2:
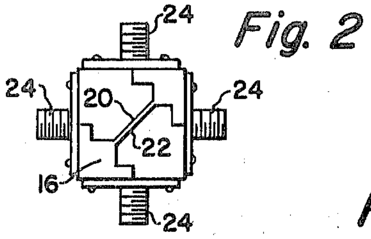
FIG. 2 is a top view of the appearance of a microstrip parallel-line directional coupler showing the manner in which it can be connected to coaxial transmission lines.
Figure 3:
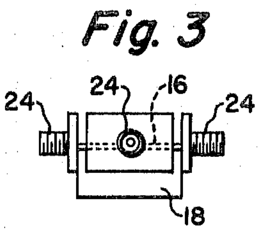
FIG. 3 is a side view of the coupler shown in FIG. 2.
Figure 4:
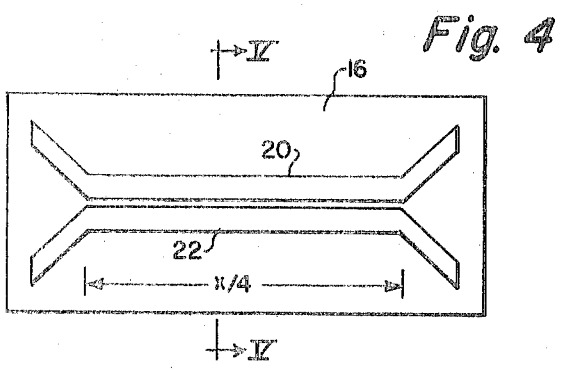
FIG. 4 is a top view of the microstrip parallel-line directional coupler of the invention.

An actual physical embodiment of a microstrip parallel-line directional coupler is shown in FIGS. 2 and 3 and again comprises a wafer 16 of semiconductive material having its lower surface covered with a layer of metal which, in turn, is connected to a copper block 18. The copper block 18, in a typical circuit application, is grounded. Deposited on the surface of the wafer 16, by photoresist etching techniques, are parallel strip conductors 20 and 22, shown in enlarged detail in FIG. 4, which preferably have a width of about 0.010 inch and a length equal to a quarter-wavelength of the wave energy which is to be coupled. Opposite ends of the two parallel strips 20 and 22 are connected to the center conductors of couplers 24 adapted for connection to coaxial wave transmission lines. The outer cylindrical conductors of the transmission lines are threaded onto the couplers 24 and, hence, are grounded along with the copper block 18.

Figure 5:
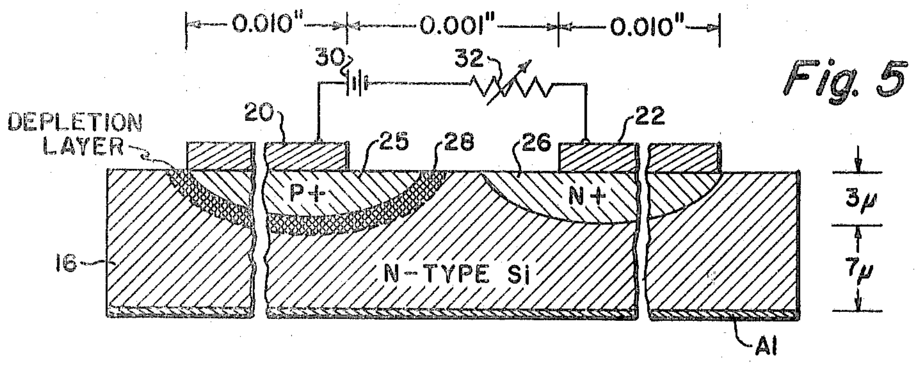
FIG. 5 is an enlarged cross-sectional view taken substantially along line V—V of FIG. 4.

As shown in FIG. 5, the semiconductor wafer 16 may comprise N-type silicon. Diffused into the N-type silicon wafer, beneath the strip 20, is a P-type region 25. Similarly, a heavily doped N-type region 26 is diffused into the wafer 16 beneath the strip 22, the two regions 25 and 26 being separated. The two regions 25 and 26, of course, may be formed by diffusion of suitable dopants into the N-type silicon substrate. Surrounding the P-type region 25 is a depletion layer 28 depleted of current carriers, and in which the space-charge of the positive donors, on one end, and the negative acceptors, on the other end, is not compensated. This system, therefore, resembles a parallel-plate condenser. When an external forward bias is applied across the two regions 25 and 26, as by way of battery 30 and variable resistor 32, the depletion region or layer decreases in width, and the capacitance across the layer increases. Similarly, if a reverse bias is applied across the regions 25 and 26, the width of the depletion layer increases, and the capacitance decreases. In either case, forward or reverse bias, the capacitance can be varied as by means of the variable resistor 32 or its equivalent. In the example given in FIG. 5, the width of the conducting strips 20 and 22 is about 0.010 inch; while the spacing between the strips is about 0.001 inch.

Suitable P–N junctions can be produced in accordance with the invention by any one of a number of methods well known to those skilled in the art. By way of specific example, a silicon substrate having vapor deposited metal lines forming a conventional quarter-wavelength, parallel-line directional coupler, can have a distributed P-N junction inserted by proper diffusion of phosphorus and boron. Suitable vapor deposited metals may comprise aluminum or silver as an example. The diffusion geometry and diffusion profiles are selected to provide a standard surface oriented variable-capacitance diode, distributed through the coupling region.

The general considerations entering into the device can be exhibited through the following analysis of a quarter-wavelength, parallel-line directional coupler. The coupling coefficient *k*, is related to the coupling capacitance through the even and odd mode impedances, $Z_{oe}$ and $Z_{oo}$, respectively. That is:

$$\frac{Z_{oe}}{Z_{oo}}=\frac{1+k}{1-k}$$

The input impedance of the coupler, $Z_o$, expressed as a function of $Z_{oe}$ and $Z_{oo}$ is:

$$Z_o=Z_{oe}Z_{oo}$$

The odd mode and even mode capacitances, $C_{oo}$ and $C_{oe}$, are related to $Z_{oe}$ and $Z_{oo}$ by the following equation:

$$\frac{Z_{oe}}{Z_{oo}}=\frac{C'_{oo}}{C'_{oe}}$$

where $C'_{oo}$ and $C'_{oe}$ are related to $C_{oo}$ and $C_{oe}$ and the respective odd and even mode velocities. Thus, the coupling coefficient as determined by the capacitive coupling is:

$$k=\frac{C'_{oo}}{C'_{oo}}\mp\frac{C'_{oe}}{C'_{oe}}$$

The role of the depletion-layer capacitance appears in the quantities $C_{oo}$ and $C_{oe}$. Consequently, the coupling coefficient, *k*, can be expressed as a function of the depletion-layer capacitance $C_D$, as follows:

$$k=\frac{a+C_D}{b+C_D}$$

where the quantities *a* and *b* are functions of the geometry of the directional coupler without the P-N junctions inserted. Finally, the depletion-layer capacitance of a P-N junction can be written in terms of the contact potential, $V_c$, and the applied direct current bias V as follows:

$$C_D=c(V_c-V)^{-n}$$

where *n* equals ½ for abrupt junctions and ⅓ for a linear, graded junction. The value for *c* is a constant, depending upon the substrate material and the doping profiles of both sides of the junction. The coupling coefficient *k*, can then be expressed in terms of the applied direct current bias to the junction as:

$$k=\frac{a+c(V_c-V)^{-n}}{b+c(V_c-V)^{-n}}$$

Figure 6:
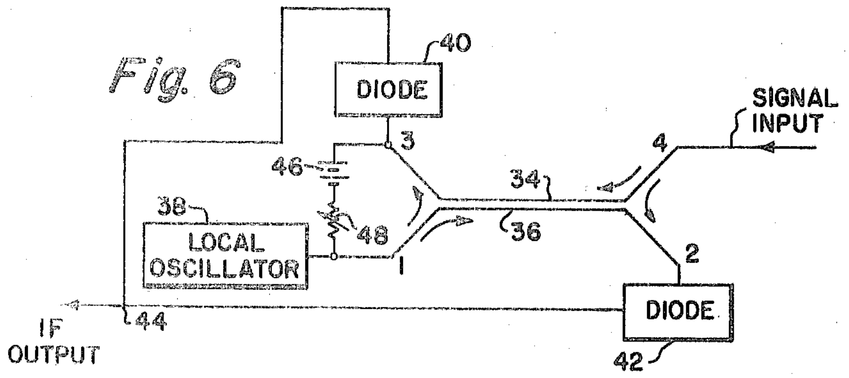
FIG. 6 is an illustration of a typical application of the microstrip parallel-line directional coupler of the invention.

A typical application of the present invention as a balanced mixer is shown in FIG. 6 wherein two parallel microstrip transmission lines 34 and 36 terminate in arms identified by the numerals 1, 2, 3 and 4. Connected to the arm 1 is a local oscillator 38; while an input signal is applied to arm 4. Diodes 40 and 42 are connected to a common point 44 at which an intermediate frequency output signal appears.

Connected across the microstrip conductors 34 and 36, which are equal in length to a quarter-wavelength of the wave energy to be coupled, are a battery 46 and resistor 48, whereby the bias across a P-N junction in a substrate beneath the strips 34 and 36, not shown, can be varied. Incident wave energy from the local oscillator 38 will break into two components, one passing from arm 1 to arm 2 and the other being coupled across the strips 34 and 36 to the arm 3. Similarly, the input signal on arm 4 will be broken into two parts, one of which passes along strip 34 to arm 3 and the other of which is coupled to strip 36 and flows to arm 2. The resulting mixed signals appearing at point 44 will comprise a signal of intermediate frequency in accordance with well-known techniques.

Although the invention has been shown in connection with certain specific embodiments, it will be readily apparent to those skilled in the art that various changes in form and arrangement of parts may be made to suit requirements without departing from the spirit and scope of the invention. In this respect, it will be apparent that a P-type substrate can be substituted for the N-type substrate shown in FIG. 5, in which case the diffused regions 25 and 26 will be $p+pn+$ rather than the $p+nn+$ regions shown in FIG. 5.

We claim as our invention:

1. A parallel-line directional coupler comprising a substrate of semiconductive material having deposited on one surface thereof parallel microstrip transmission lines, conductive material deposited on the other side of said substrate and forming a ground plane, a P-N junction formed in said substrate in the coupling region between said parallel transmission lines, and means for applying a source of biasing potential across said P-N junction whereby the depletion-layer capacitance of the P-N junction as well as the total coupling capacitance between the parallel transmission lines will be determined by the magnitude of said source of biasing potential.

2. The parallel-line directional coupler of claim 1 including means for varying said bias potential to thereby vary the coupling capacitance between the parallel microstrip transmission lines.

3. The parallel-line directional coupler of claim 1 wherein the microstrip transmission lines extend parallel to each other for a distance equal to a quarter-wavelength of the wave energy to be coupled.

4. The parallel-line directional coupled of claim 1 wherein the P-N junction extends along the entire length of said parallel microstrip transmission lines.

5. The parallel-line directional coupler of claim 1 wherein said substrate comprises N-type semiconductive material having diffused into its upper surface under one of said parallel microstrip transmission lines a P-type region and having diffused under the other of said parallel microstrip transmission lines a heavily doped N-type region, the two regions being separated by the N-type semiconductive material of said substrate.

6. The parallel-line directional coupler of claim 1 wherein said substrate comprises P-type semiconductive material having diffused into its upper surface under one of said parallel microstrip transmission lines a heavily doped P-type region and having diffused under the other of said parallel microstrip transmission lines an N-type region, the two regions being separated by the P-type semiconductive material of said substrate.

7. The parallel-line directional coupler of claim 1 wherein said parallel microstrip transmission lines are separated by an amount equal to about one-tenth of the width of each parallel strip transmission line.

References Cited

UNITED STATES PATENTS

| | | | |
|---|---|---|---|
| 3,378,738 | 4/1968 | McIver ---- | 317—235(21.1)UX |
| 3,416,042 | 12/1968 | Thomas et al. ----- | 333—10UX |
| 3,432,778 | 3/1969 | Ertel --------------- | 333—81 |
| 3,475,700 | 10/1969 | Ertel ------------ | 333—31UX |
| 3,500,255 | 3/1970 | Ho et al. ----------- | 333—10 |

PAUL L. GENSLER, Primary Examiner

U.S. Cl. X.R.

317—234; 325—446; 333—84